Patented Sept. 9, 1924.

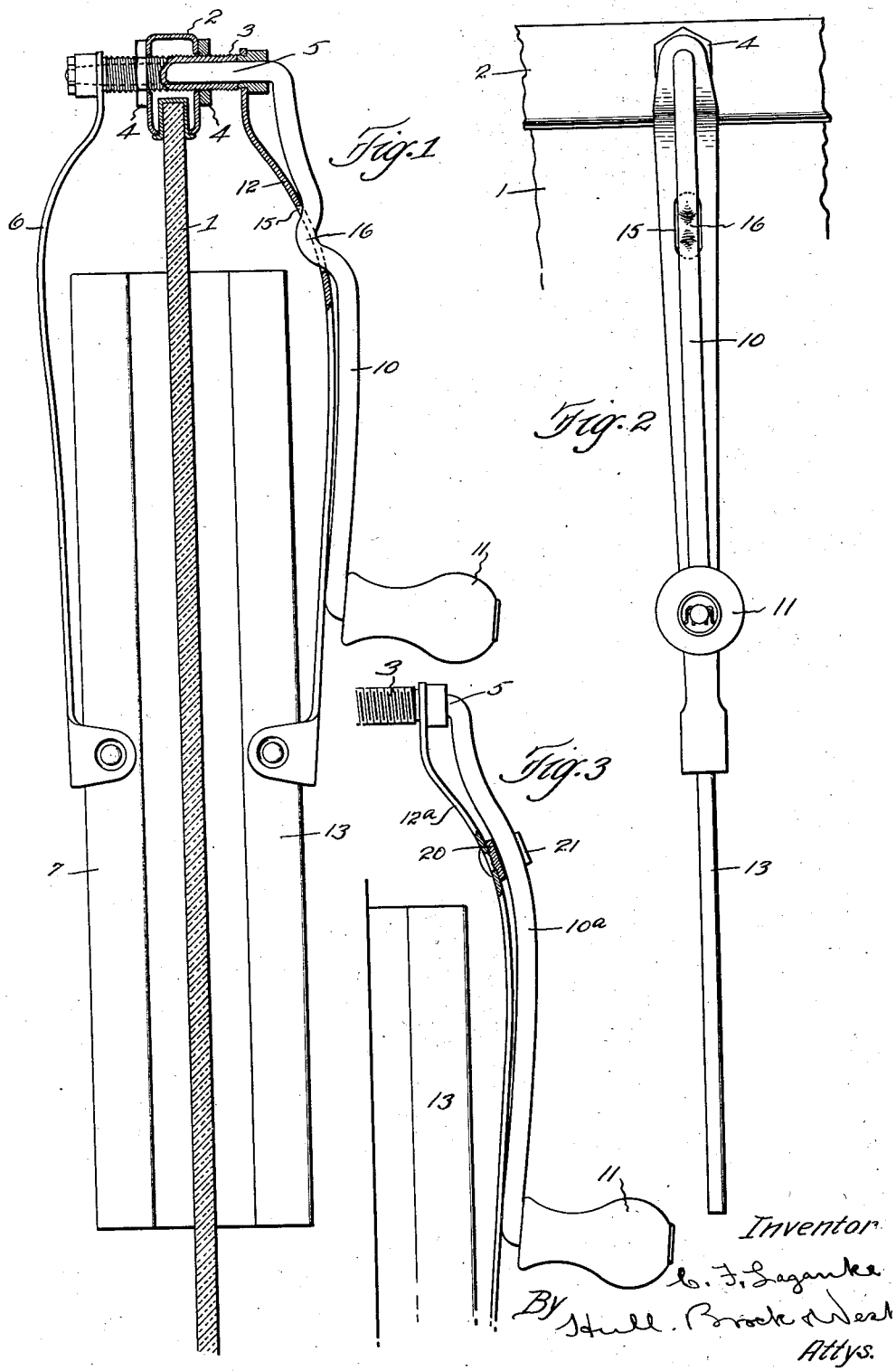

1,507,780

UNITED STATES PATENT OFFICE.

CHARLES F. LAGANKE, OF CLEVELAND, OHIO, ASSIGNOR TO THE OUTLOOK COMPANY, OF CLEVELAND, OHIO, A CORPORATION OF OHIO.

CLEANING DEVICE FOR WINDSHIELDS AND THE LIKE.

Application filed February 18, 1922. Serial No. 537,429.

*To all whom it may concern:*

Be it known that I, CHARLES F. LAGANKE, a citizen of the United States, residing at Cleveland, in the county of Cuyahoga and State of Ohio, have invented a certain new and useful Improvement in Cleaning Devices for Windshields and the like, of which the following is a full, clear, and exact description, reference being had to the accompanying drawings.

This invention relates to an improved cleaning device that is especially designed for use with the windshields of automobiles for removing rain, snow, moisture and the like from the panes thereof, although it is equally well adapted for use in connection with motormen's windows of street cars, the lookout windows of locomotive cabs, and in other analogous situations.

The present invention has to do more particularly with that class of windshield cleaners which have wipers that operate on the inner and outer sides of the panes.

Heretofore, in devices of this character, the wiper disposed on the inner side of the pane has been used as an operating handle, and when so used there is a tendency to withdraw it out of cleaning contact with the pane or so reduce its pressure thereon as to render it inefficient.

It is the fundamental object of my present invention to provide a windshield cleaner incorporating two wipers arranged for contact with opposite sides of the pane and including means for operating them which when used will in no way impair the efficiency of the inner wiper. A further object is to provide a simple, inexpensive and durable cleaner that is easy of attachment and convenient of use.

An embodiment of the invention wherein the foregoing objects, and others hereinafter appearing, are attained is illustrated in the drawing which accompanies and forms a part hereof and wherein Fig. 1 is a section through a windshield equipped with my improved cleaning device; Fig. 2 shows the parts of Fig. 1 as though viewed from the inner side of the windshield; and Fig. 3 shows a modified form of driving connection between the operating handle and the arm which carries the inner wiper.

The pane of the windshield is designated 1, and the frame thereof is designated 2. An externally threaded bearing sleeve 3 is extended through a hole in the frame 2 and is held therein against endwise movement by nuts 4 that are applied to opposite ends of the sleeve and are screwed up tightly into clamping engagement with the opposite sides of the frame. A spindle 5 is journaled in the sleeve 3, and at its outer end has secured to it an arm 6 which carries a wiper 7. The arm 6 is made of spring material and through its resiliency holds the wiper 7 in cleaning contact with the outer surface of the pane 1.

An operating handle 10 is fixed to the inner end of the shaft 5, and in the present construction it is composed of a part of the same rod which forms the shaft 5, the free end of the handle being turned laterally to provide a crank on which a knob 11 is mounted. Intermediate the inner end of the sleeve 3 and the handle 10, a wiper arm 12 is loosely mounted on the shaft 5. This arm carries a wiper 13 which, solely through the resiliency of the arm, is held with the proper degree of pressure against the pane 1.

As the invention is illustrated in Figs. 1 and 2, driving connection is effected between the handle 10 and the arm 12 by slotting the arm at 15 and bending a portion 16 of the handle abruptly forwardly for engagement within the slot of the arm. The part 16 of the handle should project far enough through the slot 15 to insure against its being accidentally withdrawn therefrom, should considerable of a pull be exerted on the knob 11. As a matter of fact, in the operation of the device, there is no need for pulling the knob at all in a direction perpendicular to the pane, although this is found to be the natural tendency. The portion 16 being reasonably near the inner end of the handle moves a comparatively short distance even though the free end of the handle may be pulled quite a material distance from the arm 12.

It may be explained that the connections between the arms 6 and 12, and their respective wipers 7 and 13, are of a ball-and-socket nature, so as to afford a so-called universal movement of the wipers. This particular form of connection, and the connection between the arm 6 and the outer end of the shaft 5, are fully disclosed in my former application Serial No. 500,138, filed September 12, 1921. Furthermore, it may be stated that, while I have shown the present device as having its operating spindle, with the bearing sleeve 3 which supports it, extending through a hole in the windshield frame, I may follow either of the other common forms of mounting the device which provide for supporting the bearing 3 within an aperture in the windshield pane, or for supporting the spindle 5 within a bearing bracket that is applied to and extends over the top of the frame.

Fig. 3 shows a modified form of the driving connection between the operating handle and the carrying arm of the inner wiper. In this embodiment, the arm 12ª has secured to it a member 20 which has a notch 21 for the reception of a handle 10ª. In this, as in the former instance, the arm is caused to travel with the handle in a lateral direction, but the handle is free to move independently of the arm in a direction perpendicular to the windshield pane.

Having thus described my invention, what I claim is:

1. In a device of the character set forth, the combination of a pair of wipers arranged for cleaning contact with the opposite sides of a windshield pane, a resilient carrying arm for each of said wipers, a spindle to which the arm of the outer wiper is directly secured and whereon the arm of the inner wiper is loosely mounted, and an operating handle extending laterally from the inner end of the spindle and by means of which the spindle may be operated, the handle and carrying arm of the inner wiper interengaging in such manner as to cause the arm to move with the handle in a lateral direction while permitting the handle to move independently of the arm in a direction perpendicular to the windshield pane, the inherent resiliency of the inner arm serving to maintain the wiper that is carried thereby in cleaning contact with the pane at all times.

2. In a device of the character set forth, the combination of a pair of wipers arranged for cleaning contact with the opposite sides of a windshield pane, a carrying arm for each of said wipers, a spindle to which the arm of the outer wiper is secured and whereon the arm of the inner wiper is loosely mounted, and an operating handle extending laterally from the inner end of the spindle and by means of which the spindle may be rotated, the carrying arm of the inner wiper having laterally spaced portions between which a part of the operating handle is disposed thereby to cause the arm to move with the handle in a lateral direction while the handle is permitted to move independently of the arm in a direction perpendicular to the windshield pane.

3. In a device of the character set forth, the combination of a pair of wipers arranged for cleaning contact with the opposite sides of a windshield pane, a carrying arm for each of said wipers, a spindle to which the arm of the outer wiper is secured and whereon the arm of the inner wiper is loosely mounted, and an operating handle extending laterally from the inner end of the spindle and by means of which the spindle may be rotated, the carrying arm of the inner wiper having a slot, and the operating handle an offset which enters the slot thereby to cause the arm to swing with the handle in a lateral direction while the arm is permitted to move independently of the arm in a direction perpendicular to the windshield pane.

In testimony whereof, I hereunto affix my signature.

CHARLES F. LAGANKE.